United States Patent [19]
Harr

[11] Patent Number: 5,495,779
[45] Date of Patent: Mar. 5, 1996

[54] SMOOTH RIMMED DIFFERENTIAL GEAR

[76] Inventor: Ewald Harr, Schwaigerner Strasse 19, D-74193 Schwaigern, Germany

[21] Appl. No.: 147,551

[22] Filed: Nov. 5, 1993

[30] Foreign Application Priority Data

Nov. 6, 1992 [DE] Germany .................. 42 37 463.4

[51] Int. Cl.⁶ ............................. F16H 21/14
[52] U.S. Cl. ............................. 74/650; 74/66
[58] Field of Search .................. 74/650, 665 F, 74/665 H, 665 S, 66, 68, 69

[56] References Cited

U.S. PATENT DOCUMENTS

| | | | |
|---|---|---|---|
| 885,390 | 4/1908 | Sittmann | 74/66 |
| 1,098,422 | 6/1914 | Bayly | 74/650 |
| 1,224,746 | 5/1917 | Hveem . | |
| 1,364,745 | 1/1921 | Gerber | 74/650 |
| 1,437,510 | 12/1922 | Gerber | 74/650 |
| 1,561,150 | 11/1925 | Gerber | 74/66 |
| 4,291,591 | 9/1981 | Ross | 74/650 |

FOREIGN PATENT DOCUMENTS 292575  4/1914  Germany .

OTHER PUBLICATIONS

German Search Report No. P 47 37 463.4 dated Jun. 18, 1993.

Primary Examiner—Rodney H. Bonck
Assistant Examiner—Sherry Estremsky
Attorney, Agent, or Firm—Wigman, Cohen, Leitner & Myers

[57]     ABSTRACT

A differential gear is disclosed in which neither the clutching device which connects the output elements to a bearing block, which is set rotating by means of a drive element, nor the output elements, include a toothed rim. Each of the two output elements is provided with one connecting link having connecting points which lie eccentrically to the axis of rotation of the output element and which connect with the clutching device. The clutching device includes a coupling link, which is mounted in the bearing block so as to rotate around an axis, which extends perpendicularly to the axis of rotation of the bearing block between the two output elements.

6 Claims, 12 Drawing Sheets

SMOOTH RIMMED DIFFERENTIAL GEAR

BACKGROUND OF THE INVENTION

The invention relates to a differential gear and more particularly to a differential gear with a swivel-mounted bearing means which can be rotated by a drive element.

Conventional differential gears of this kind are used predominantly in motor vehicles to transfer torque to the driven axle. The two output elements are designed as bevel gears, which engage with the differential bevel gears, which are swivel-mounted in the bearing means, which is designed as the differential case.

SUMMARY OF THE INVENTION

The present invention provides a differential gear based on a different principle of construction than conventional differential gears. In the differential gear according to the present invention, the torque is transferred from the coupling device, in the following named as clutching device, to the two output elements in the manner of a crank gear. Therefore, neither the output elements nor the clutching device include a toothed rim. Toothed rims are unnecessary for transferring the torque from the bearing means to the clutching device because the rotation, which is exhibited by the coupling link of the clutching device and which is necessary for driving the output elements around the transverse axis of the coupling link can be achieved by driving the bearing means. At most a gear wheel for transferring the drive torque to the bearing means is necessary.

The clutching device and in particular its coupling link can be designed in various ways. If the coupling link in the bearing means, can be rotated not only around its longitudinal axis, but it can also be moved in the direction of its longitudinal axis, and if two arms, whose free ends have the shape of at least an incomplete ball, project in opposite directions from the coupling link, then it is advantageous to mount these balls, forming one ball joint each in a spherical bearing bed of one swash plate each. The balls are connected at a distance from the center of the bearing bed to the assigned connecting link in its eccentrically arranged connecting point so as to swivel around an articulated axle, extending at right angles to its axis of rotation.

In another embodiment, the eccentrically arranged connecting point of both connecting links is formed by a cylindrical bearing surface, which extends parallel to the axis of rotation of the connecting link. In this way a ball of the coupling link can be rotated and moved in the direction of the axis of the cylindrical bearing surface. It is especially advantageous to arrange between the ball and the cylindrical bearing surface a bearing ring with spherical inner surface and cylindrical outer surface, because then the bearing forces are not concentrated on a linear region, but rather are distributed over a striated area.

In another very advantageous embodiment, the eccentrically arranged connecting points of the output elements are formed by an at least incomplete ball each and the coupling link is ensured against shifting in the direction of its axis of rotation relative to the bearing means and exhibits two recesses, which are arranged diametrically with respect to the axis of rotation and with which the one or the other ball engages, forming a ball joint, which can be moved in the direction of the axis of rotation of the coupling link and the output elements. In this case, it is expedient to arrange between the ball and the guide surfaces, formed by the recess, a bearing ring with spherical inner surface and outer surfaces resting on the guide surfaces.

One special advantage of the differential gear according to the invention lies in the fact that it can be provided in a simple manner with a braking device. This gives the differential gear the effect of a locking differential and exerts a braking torque on the output element exhibiting the higher rotational speed when the two output elements exhibit different rotational speeds.

Insofar as the coupling link at different rotational speeds of both output elements carries out a translatory oscillating movement in the direction of its longitudinal axis, each of the two end segments of the coupling link can be designed, for example, as a piston; and said piston can be assigned to a cylinder that is immoveable relative to the bearing means. These pistons can pump a fluid, which is located in the two cylinders through a channel penetrating the coupling link. The braking effect depends on the energy required to transport the fluid; and the more the transport of fluid is throttled from one cylinder to the next, the higher is the demand for energy.

The rotation of the coupling link around its axis can also be used for activating the braking device; said rotation existing at different speeds of the output elements. In this case a rotary piston is connected twist-proof to the coupling link which engages with a cylinder mounted immoveably on the bearing means. A fluid which is located in the cylinder is pumped through a throttle segment between two cylinder chambers when the rotary piston rotates so as to oscillate around the axis of rotation of the coupling link. In so doing, the braking effect can be changed in a simple manner by changing the size of the gap between the rotary piston and the inner wall of the cylinder. Furthermore, the inner wall of the cylinder can be designed in such a manner that the width of the throttle gap tapers off from the middle of the swivel region of the rotary piston to the two ends of the swivel region. Since the angular speed of the rotary piston also decreases in this direction, the speed-induced reduction of the braking torque can be at least partially compensated for by narrowing the throttle gap.

BRIEF DESCRIPTION OF THE DRAWINGS

In the following the invention is explained in detail with the aid of the embodiments shown in the drawings, wherein.

DETAILED DESCRIPTION OF THE PREFERRED EMBODIMENTS

Figure 1:
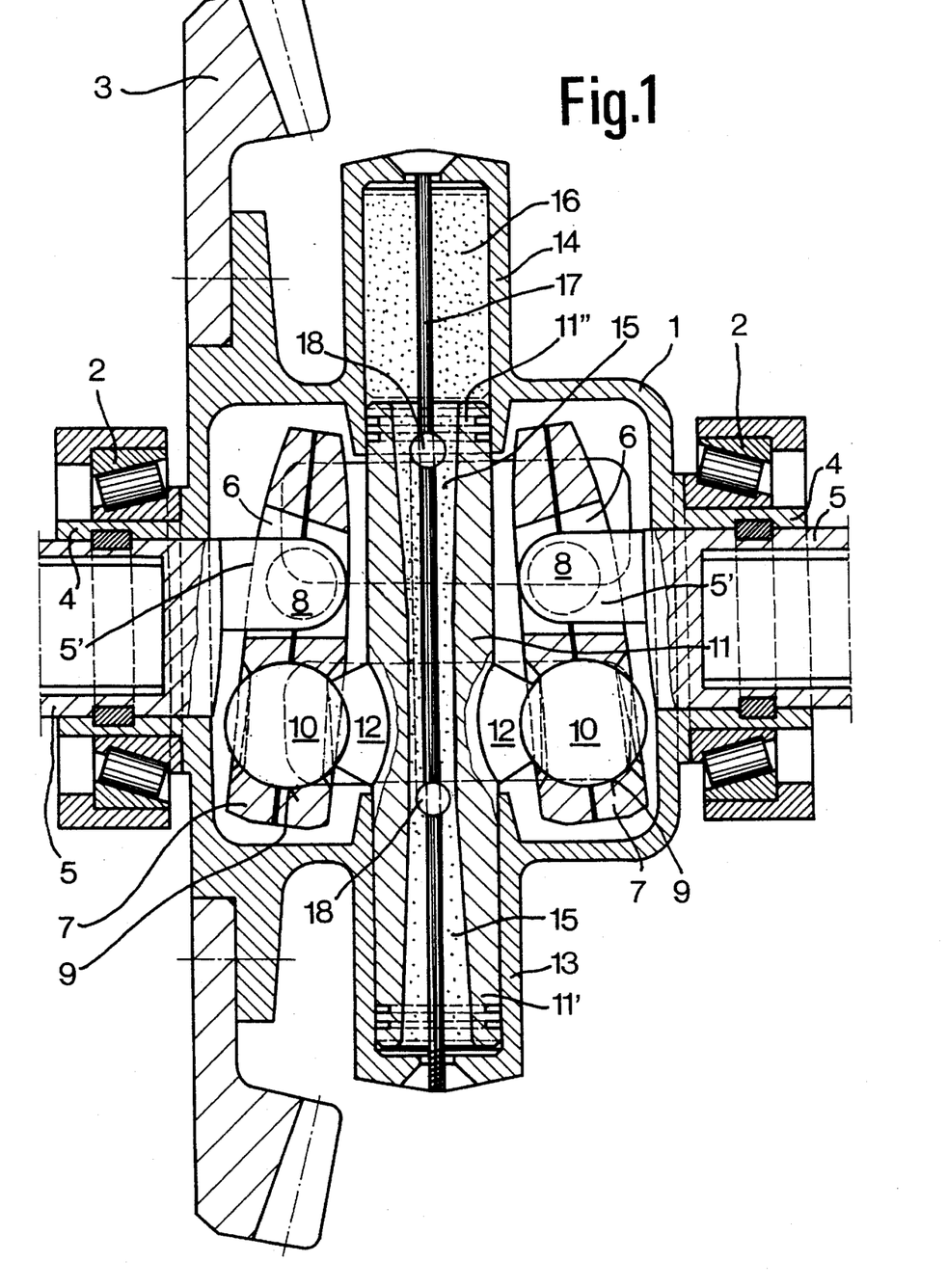
FIG. 1 is a longitudinal view of a first embodiment of the present invention.

Referring now to the drawings wherein like numbers indicate like elements throughout the several views. In FIG. 1 a differential gear is employed, for example, for the axle drive of a motor vehicle, and includes a cast housing 1, having two halves. Housing 1 is swivel-mounted in a transmission case (not illustrated) so as to be rotatable around its axis of symmetry by means of two roller bearings 2. A ring gear 3, which is centered relative to the axis of rotation of the housing 1 and mounted on said housing, serves the rotary drive of housing 1.

One output element 5 each can be rotated and axially moved in the two bushings 4 of housing 1, which are carried by roller bearings 2. Each of the two coaxial output elements 5, whose axis aligns with the axis of rotation and symmetry of housing 1, is provided with a central blind bore, which serves to receive and connect twist-proof the output element 5 to an output shaft (not illustrated). A rod-shaped protrusion 5', which is provided with a cross bore and which projects in the axial direction, is mounted eccentrically on the front side of two identical output elements 5 that points toward the inside of housing 1.

Protrusion 5' engages with a passage 6 of a swash plate 7 and is hinged to swash plate 7 within passage 6 by means of bolt 8 penetrating the cross bore of said passage. At a radial distance of the passage 6 each of the two identically designed swash plates 7 exhibits a spherical bearing surface 9, in which is mounted a ball 10 forming a ball bearing. So that the ball 10 can be inserted into the spherical bearing surface 9, the two swash plates 7 are made of two parts. Of course, the swash plates 7 can also be divided in another manner as shown in FIGS. 1 and 2.

Two balls 10 form the free end of each arm 12 projecting in the diametrical direction from a cylindrical center piece 11 of a coupling link. The cylindrical center piece 11, the arms 12, the balls 10 and the two swash plates 7 together form a clutching device, which connects the output elements 5 to the housing 1. In this manner the rotational motion of housing 1 can be transferred only to one output element 5, only to the other output element 5, or, to both output elements 5, whereby in the latter case the speed of both output elements 5 can be different.

Center piece 11 can be rotated around its longitudinal axis along the length of its longitudinal central axis, which is perpendicular to the axis of rotation of the housing, in the center between two output elements 5 and thus also in the center between two swash plates 7; said center piece can be moved in the direction of its longitudinal axis. Therefore, center piece 11 can carry out a combined rotational and translatory motion with respect to housing 1, as is required if the two output elements 5 are not driven in synchronization. At the same time, swash plates 7 carry out a tumbling movement, since their rotational motion is superposed by a swivelling motion around bolt 8. If, for example, housing 1 is rotated by 90° out of the position, which is shown in FIG. 1 and in which two output elements 5 have the same angular position, and output element 5 shown on the left in FIGS. 1 and 2 is locked, then output element 5, shown on the right in FIGS. 1 and 2, is rotated by 180° by the clutching device, thus moving center piece 11, which rotates simultaneously, to the top in the direction according to FIG. 1. During this combined rotational and translatory motion of center piece 11, two swash plates 7 are swivelled into the positions shown in FIG. 2.

Figure 2:
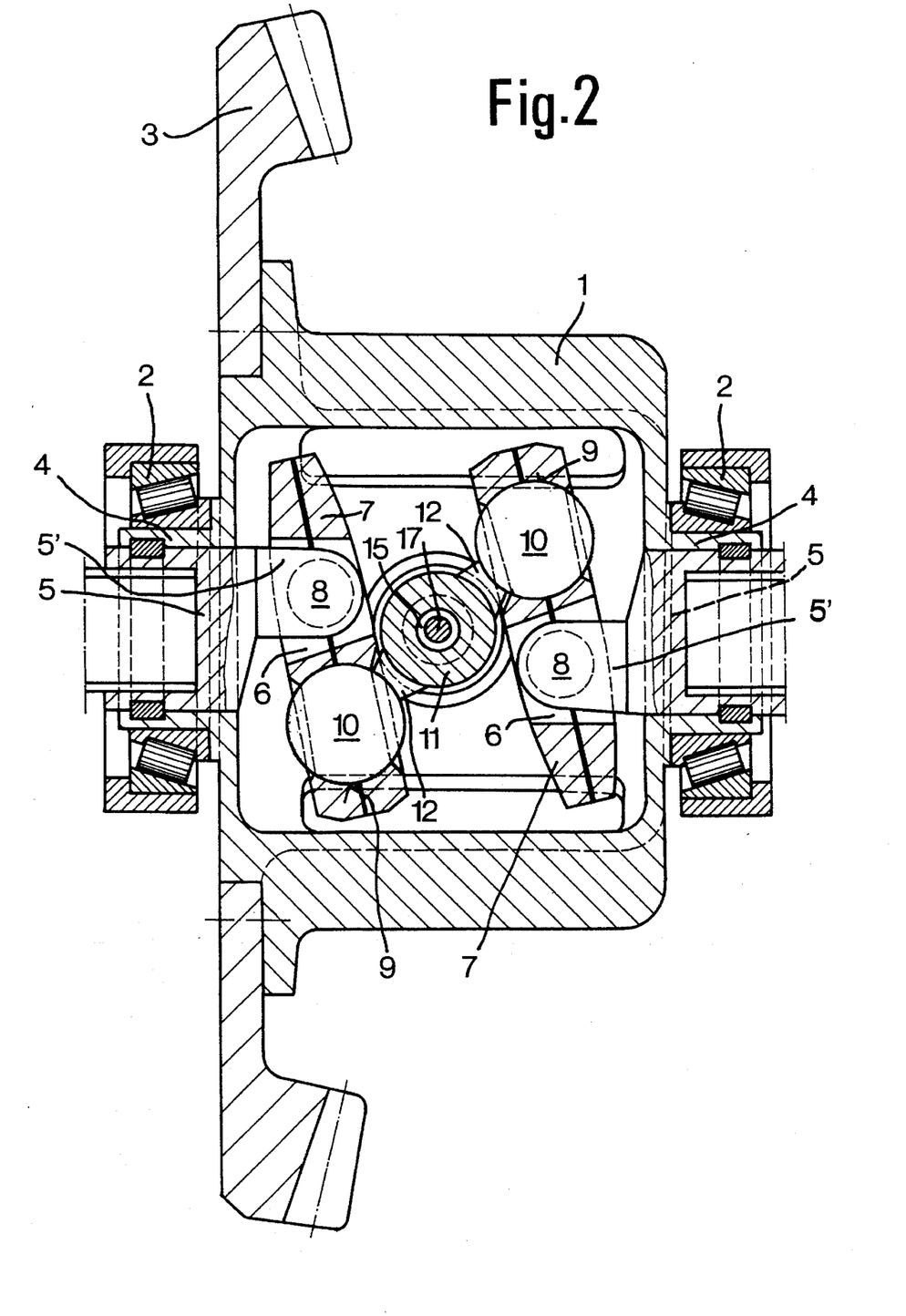
FIG. 2 is a cross sectional view of the first assignment in a different rotational position of the output elements.

In the embodiment, shown in FIGS. 1 and 2, the two end segments of center piece 11 are designed as pistons 11' or 11", which are guided by means of piston rings in one cylinder each 13 or 14 molded to housing 1. A central channel 15, above which the working chambers of both cylinders 13 and 14 communicate, penetrates center piece 11, including pistons 11' and 11". Cylinders 13 and 14 and channel 15 are filled with a fluid, which in the embodiment is an oil used for shock absorbers. Since pistons 11' and 11" automatically carryout a lifting movement when there is a difference between the speeds of both output elements 5, the consequence of each difference in the speed of output elements 5 is that fluid 16 is continuously displaced from the assigned piston by the one or the other of cylinders 13 and 14 and is pushed through channel 15. Thus, the longitudinal movement of center piece 11 is impeded, whereby the size of the impeding effect depends on the throttling effect of channel 15 and the lifting speed of pistons 11' and 11". As in the case of locking differential, the consequence of the impeding effect exerted on Center piece 11 is that a fraction of the torque exerted on housing 1 is always transferred to both output elements 5, whereby the size of this fraction can be determined by the throttling effect of channel 15.

In this embodiment, rod 17, whose end regions are connected to both cylinders 13 and 14 and which bears two balls 18, extends through channel 15, in order to control the throttling effect of channel 15. Due to the fact that channel 15 has a cylindrical center segment and an end segment, which expands conically in the direction of the neighboring free end of center piece 11, the free cross section of channel 15 is enlarged due to balls 18, which are stationary with respect to housing 1, when center piece 11 moves from the final position, shown in FIG. 1, into its central position, in which each of pistons 11' and 11" has performed one half of the lift. As center piece 11 continues to move into the other final position, the effective free cross section of the channel 15 then decreases. This throttling effect can also be achieved with a single ball, arranged over half the length of rod 17, when channel 15 tapers off starting from half its length and going in the direction of both ends, since then in the central position of center piece 11 the ball is in the area of greatest channel diameter. Since the speed, with which center piece 11 moves at different speeds of the output element, increases starting from its final position up to the central position and then decreases again, a constant throttling effect and thus also a constant locking effect can be achieved in each position of both pistons 11' and 11".

Insofar as rod 17 can be adjusted, embodiments, in which the throttling effect and thus the locking effect of the differential gear can be changed, are also possible.

Figures 3, 5:
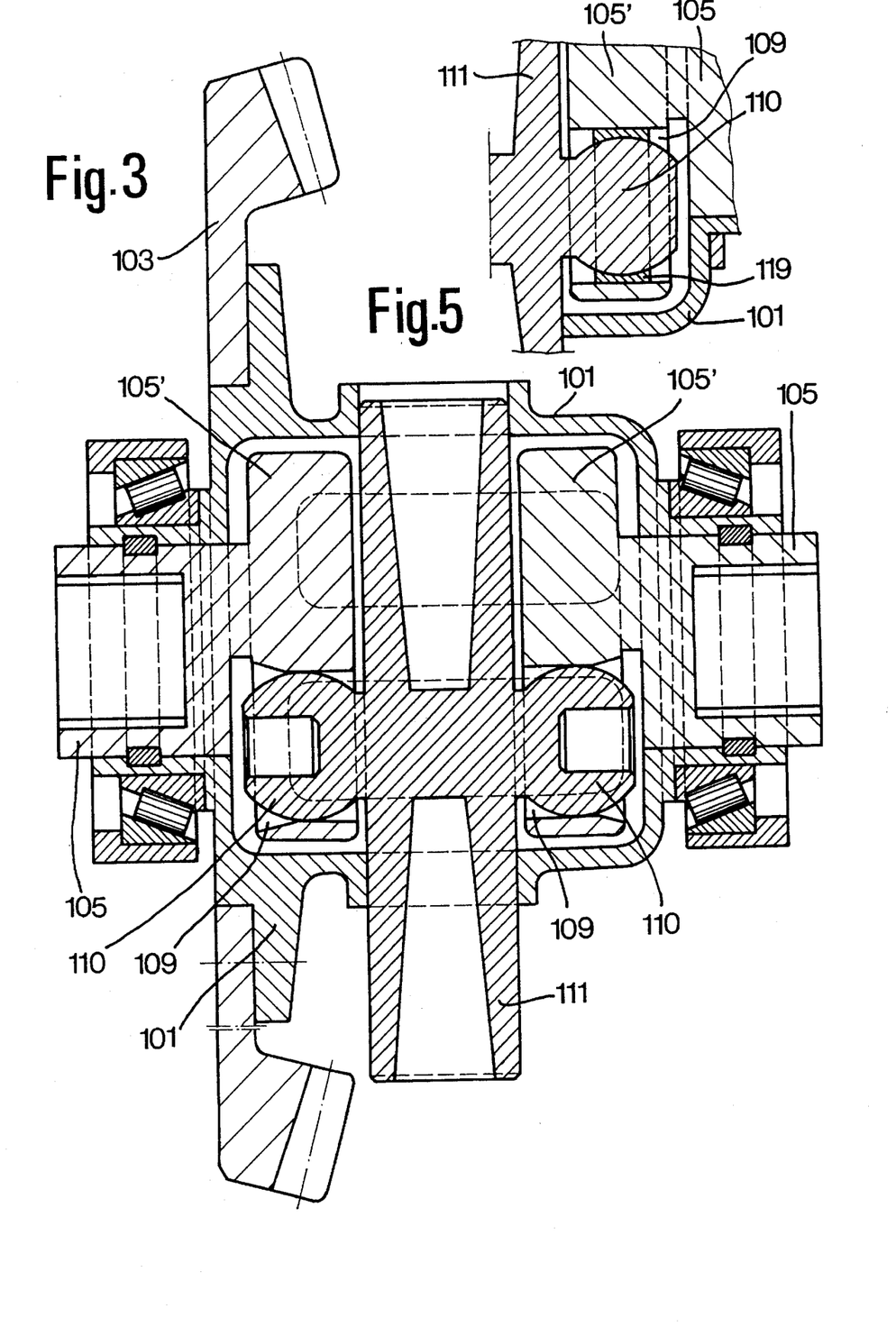
FIG. 3 is a longitudinal view of a second embodiment according to FIG. 1.
FIG. 5 is an output of a longitudinal view of a variation of the second embodiment according to FIG. 3.
Figure 4:
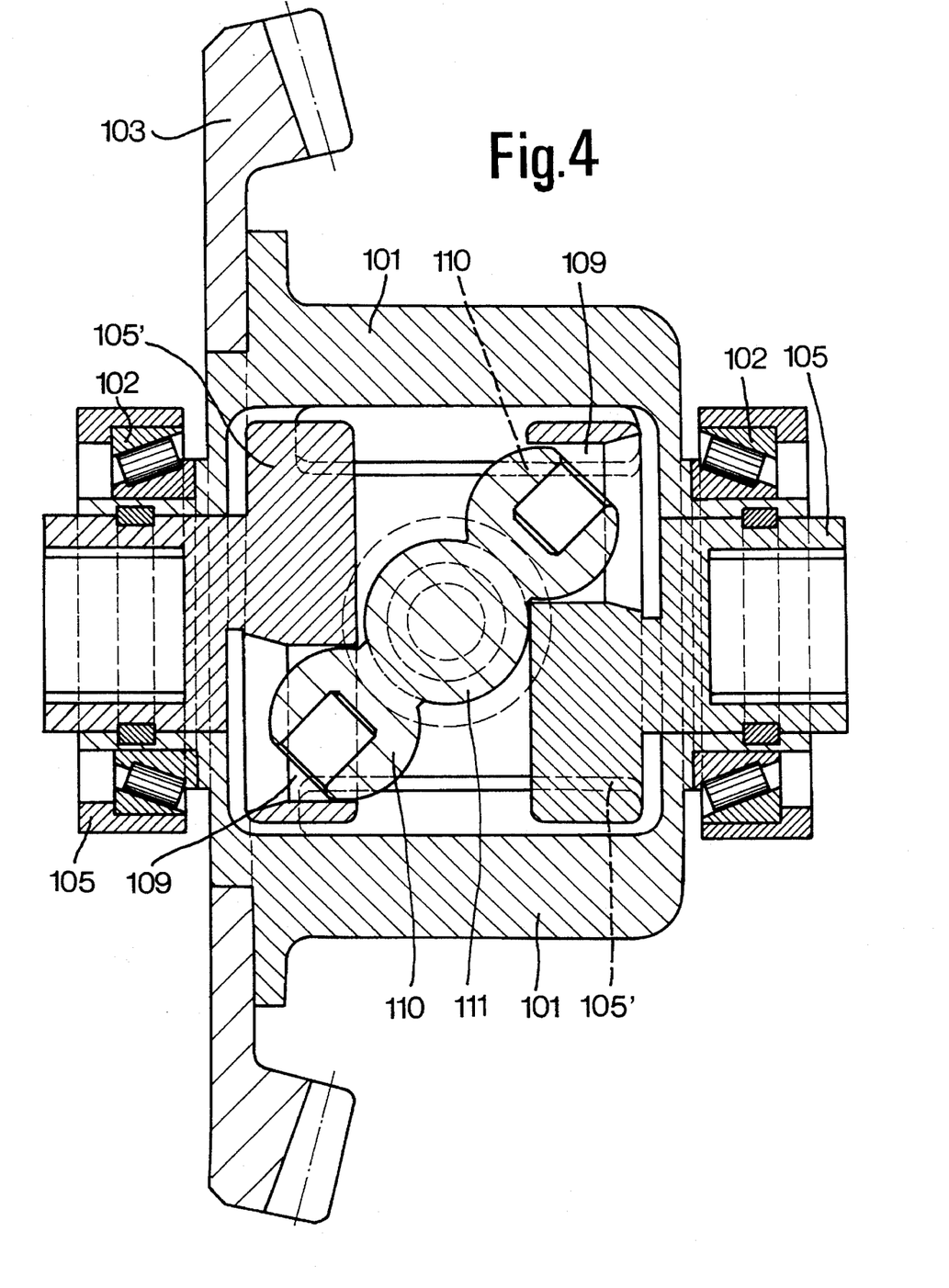
FIG. 4 is a cross sectional view of the second embodiment according to FIG. 2.

The second embodiment. shown in FIGS. 3 to 5, differs only partially from the first embodiment described above. Therefore, matching parts are denoted with reference numerals greater by 100 in the following description.

Two balls 110, project over half the length of the cylindrical center piece 111 in the diametrical directions are molded directly to center piece 111. Each ball 110 engages with an eccentrically arranged bore 109 of plate 105', which is arranged inside the housing 101 coaxially to the assigned output element 105 and firmly connected to the said output element, being designed as one piece in the embodiment. Bores 109 of the two identical plates 105 are laterally reversed. Bores 109 together with balls 110 form a pair of ball joints. Thus, balls 110 in the bores 109 can be rotated and also moved in the longitudinal direction of the bores. The capability of balls 110 to slide in bores 109 enables the use of one element each, connected firmly to the assigned output element 105, instead of the swash plates.

In FIG. 5, balls 110 do not rest directly on the inner wall of the assigned bore 109. An annular bearing means 119, which has a spherical inner surface and a cylindrical outer surface, can also be provided between ball and inner wall of the bore. Such a bearing means 119, which is made preferably of a material with good sliding properties, enlarges the stress areas and thus dramatically reduces the specific stress both on the ball surface and also the inner shell of bore 109.

In the embodiment according to FIGS. 3 to 5, the two end segments of center piece 111 could be designed, as in the first embodiment, as pistons, each of which can be moved in a cylinder which is firmly connected to housing 101. Then center piece 111 would have to be provided in its center segment with an axial passage bore, in order to form a throttling segment for the fluid to be displaced by the piston.

For other details of the second embodiment reference is made to the description of the first embodiment.

Figure 6:
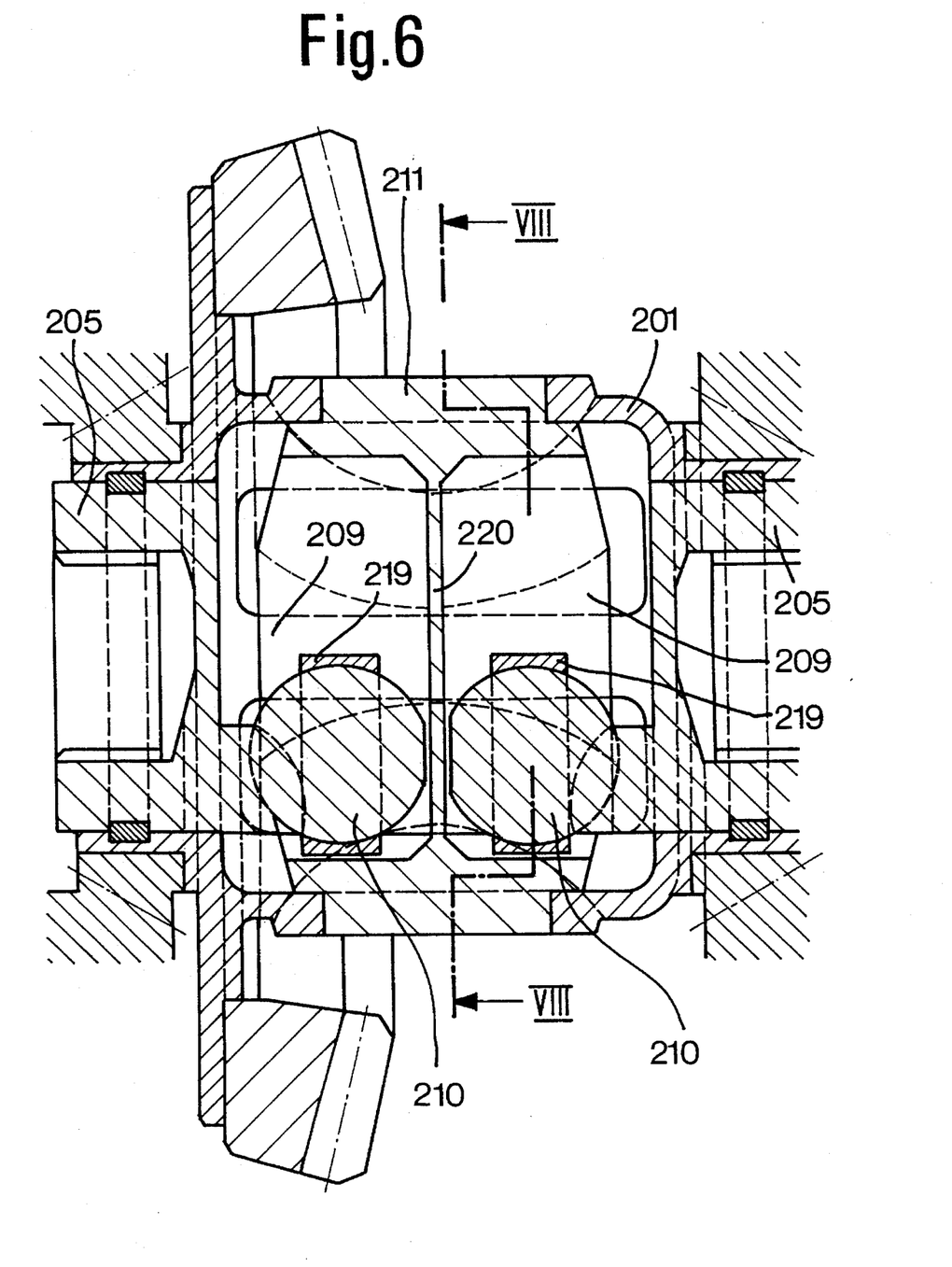
FIG. 6 is a longitudinal view of a third embodiment according to FIG. 1.
Figure 7:
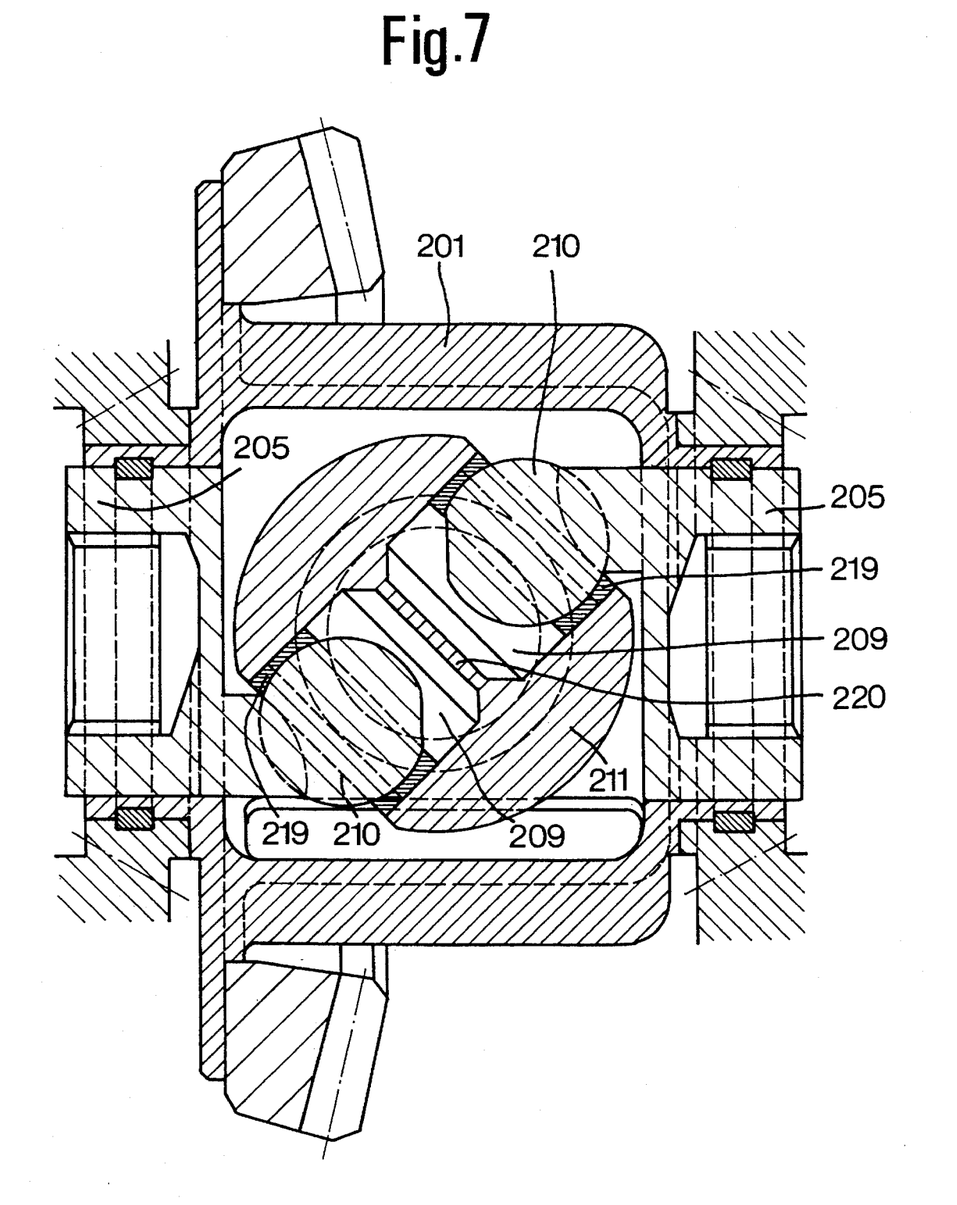
FIG. 7 is a cross sectional view of the third embodiment according to FIG. 2.
Figure 8:
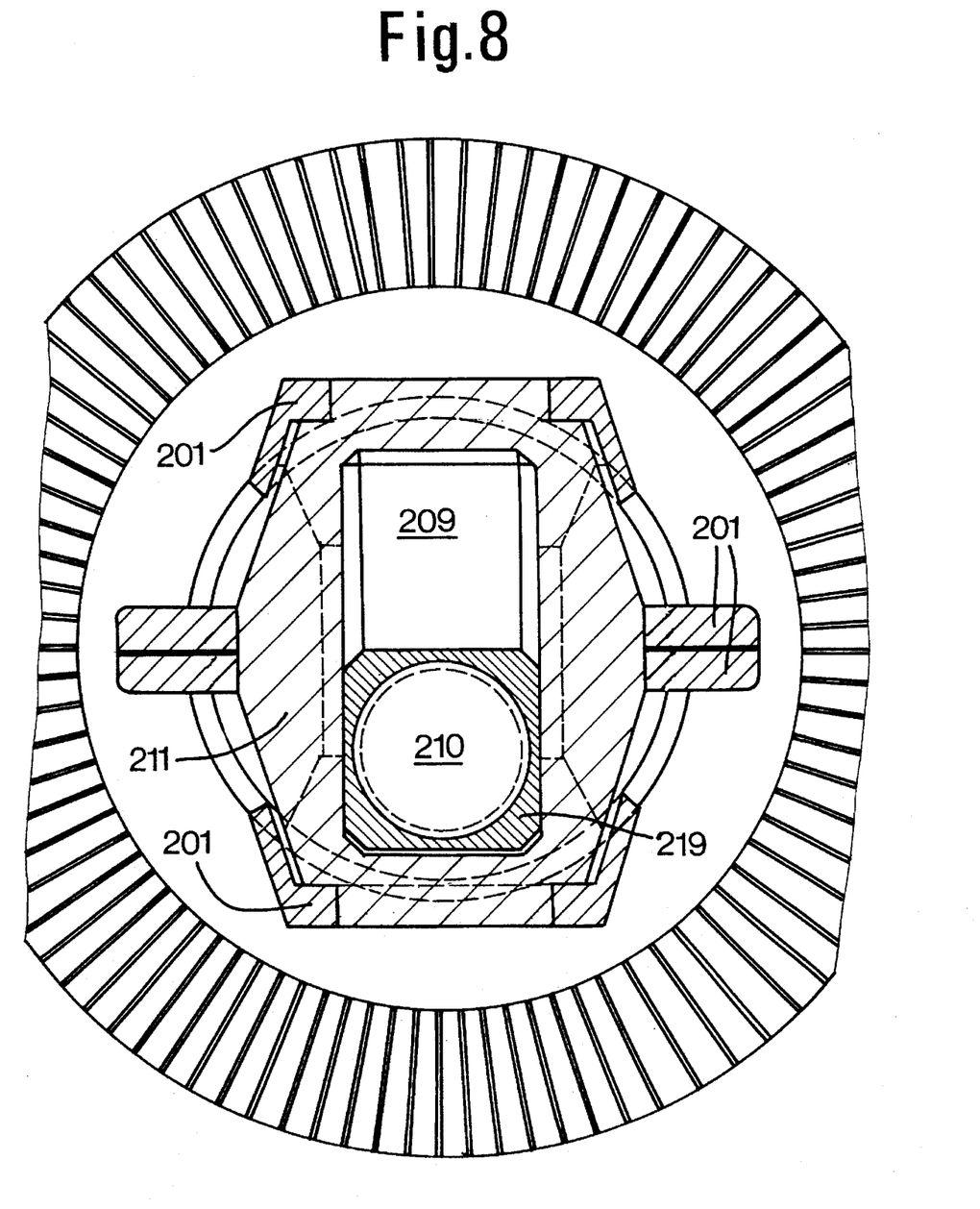
FIG. 8 is a sectional view taken along the line VIII—VIII of FIG. 6.

The embodiment, shown in FIGS. 6 to 8, is also in agreement with the embodiments described herein above; for which reason only the non-conforming features of this embodiment are explained in essence and the reference numerals, used for the matching parts, are denoted as 100 or 200 greater than the reference numerals of the first or the second embodiment.

Each of two output elements 205, which are centered relative to the housing's axis of rotation coaxially in housing 201, include one ball 210 on an eccentrically arranged arm protruding from the face projecting into housing 201. Each of these two balls 210 engages with one oblong recess 209, both of which are opposite each other in coupling link 211. This rod-shaped coupling link 211 can be rotated in the region of its two end segments, but can be moved axially in housing 201, and in particular between two output elements 205, wherein its axis of rotation intersects that of two output elements 205.

Two square recesses 209 are separated by a partition 220 and have a constant depth, which is slightly larger than the largest penetration depth of balls 210. Two side boundary walls of recess 209 that extend in the direction of the axis of rotation of coupling link 211 are flat and are designed parallel to each other and parallel to the axis of rotation of coupling link 211. They serve as side guide surfaces for one bearing ring 219, which internally has a spherical bearing surface for receiving balls 210, and externally has a flat sliding surface adjacent to the side boundary walls of recess 209.

Bearing rings 219, which envelop balls 210, can be moved both in the direction of the axis of rotation of coupling link 211 and also radially to the same in the recess receiving them. Therefore, in this embodiment, recess 209, bearing ring 219 and ball 210 form a ball joint, which can be moved in the radial and axial direction of coupling link 211. Due to the axial moveability of the ball joint, axial moveability of the coupling link 211 relative to the housing 201 can be dispensed with. If the two output elements 205 exhibit different speeds, then for this reason coupling link 211 performs only one rotational movement. The additionally required moveability of the ball joints in the direction of the axis of rotation of coupling link 211 is guaranteed through the moveability of bearing ring 219 in recess 209.

As FIG. 8 shows, housing 201 comprises two halves just like the other embodiments. Furthermore, FIG. 8 shows that bearing ring 219 envelops ball 210 and is guided on the side boundary walls of recess 209. For other details reference is made to the descriptions of the first and second embodiments.

Figure 9:
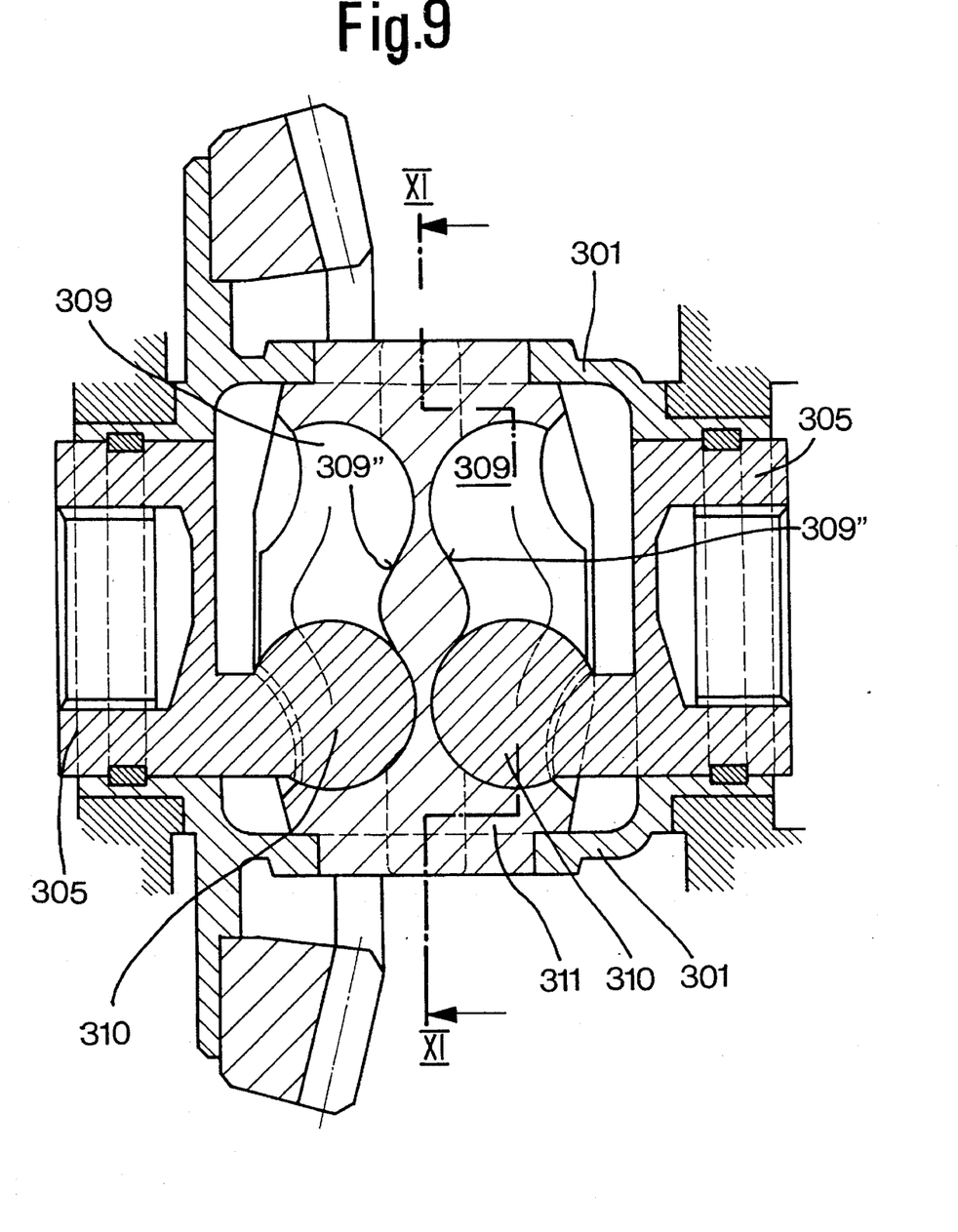
FIG. 9 is a longitudinal view of a fourth embodiment according to FIG. 1.
Figure 10:
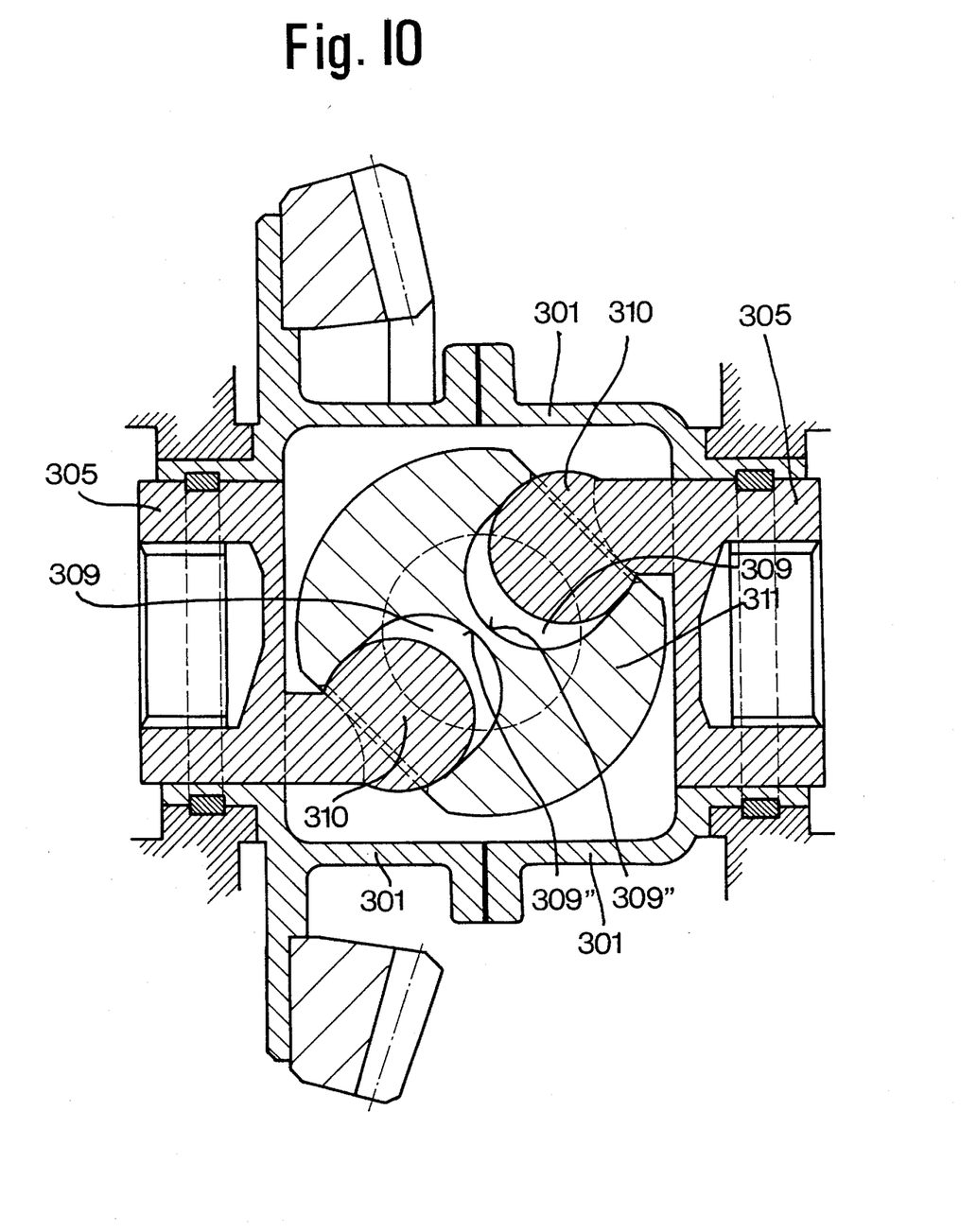
FIG. 10 is a cross sectional view of the fourth embodiment according to FIG. 2.
Figure 11:
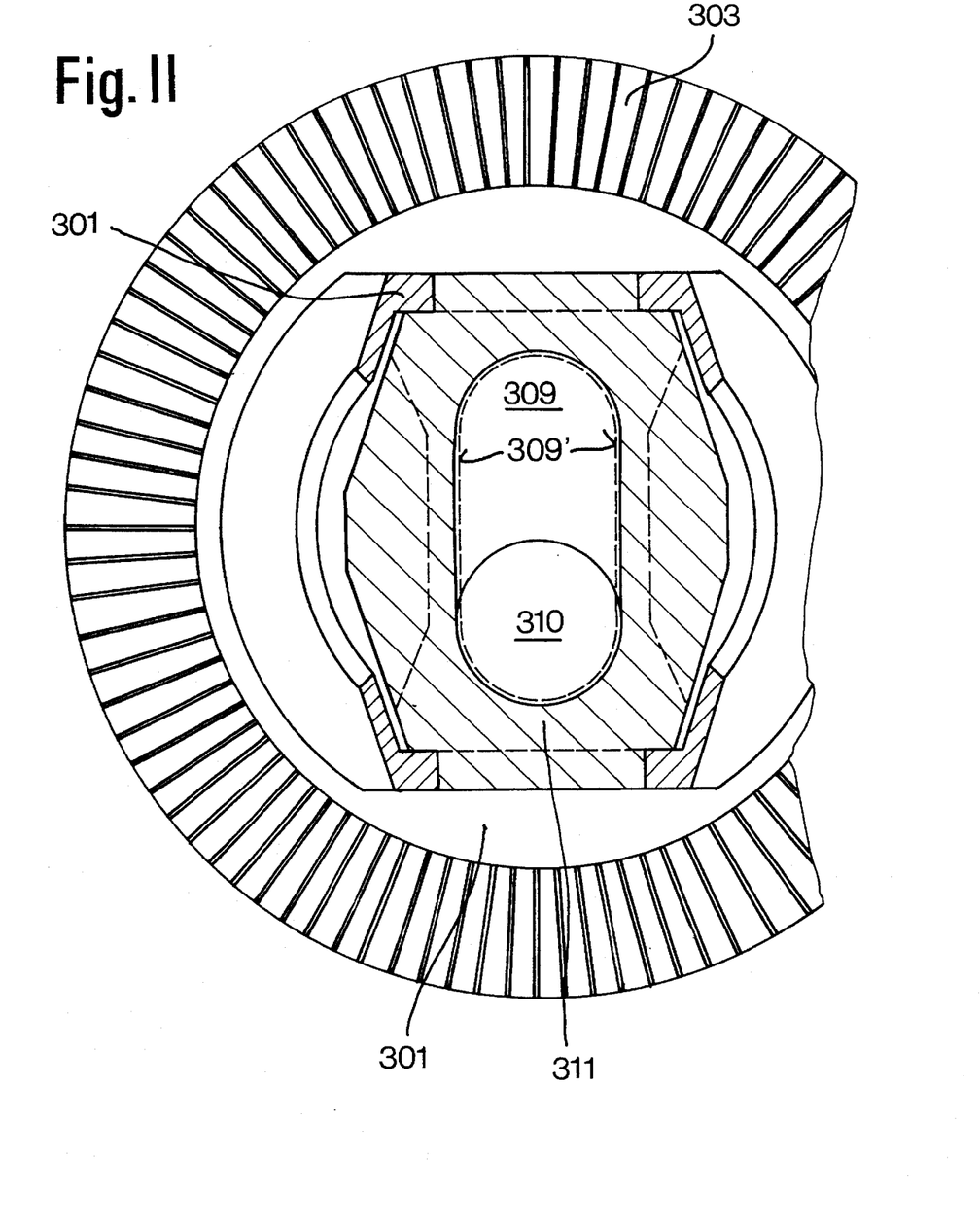
FIG. 11 is a sectional view taken along the line XI—XI of FIG. 9.

A fourth embodiment, shown in FIGS. 9 to 11 differs from the third embodiment only in the different shape of the two opposite recesses 309 provided in coupling link 311. Therefore, the fourth embodiment is described only in regard to this deviation. In addition, the matching parts are labelled with reference numerals that are larger by 100 as compared to those of the third embodiment.

The width of the two recesses 309, which extend in the direction of the axis of rotation of coupling link 311, is adapted to the diameter of balls 310, which are molded eccentrically to the one or the other output element 305. As FIG. 11 shows, side boundary walls 309' of the recesses 309 are, therefore, flat surfaces. In contrast, bottom 309' of recesses 309 is curved, and in particular, as FIG. 9 shows, in such a manner that the penetration depth of the ball 311 into the recess 309 is defined by its bottom 309". Since the penetration depth into the two end regions of recess 309 has to be the largest, the bottom 309" rises from here up to half the length of the recess 309, whereby a concave curvature in the two end segments passes over into a convex curvature in the center segment. Insofar as the speed of both output elements 305 is not identical, coupling link 311 rotates around an axis of rotation. Simultaneously balls 310 in the assigned recess 309 move both in the axial direction of coupling link 311 and in its radial direction, which means that in this embodiment, too, the two ball joints migrate.

For more details reference is made to the preceding embodiments.

Figure 12:
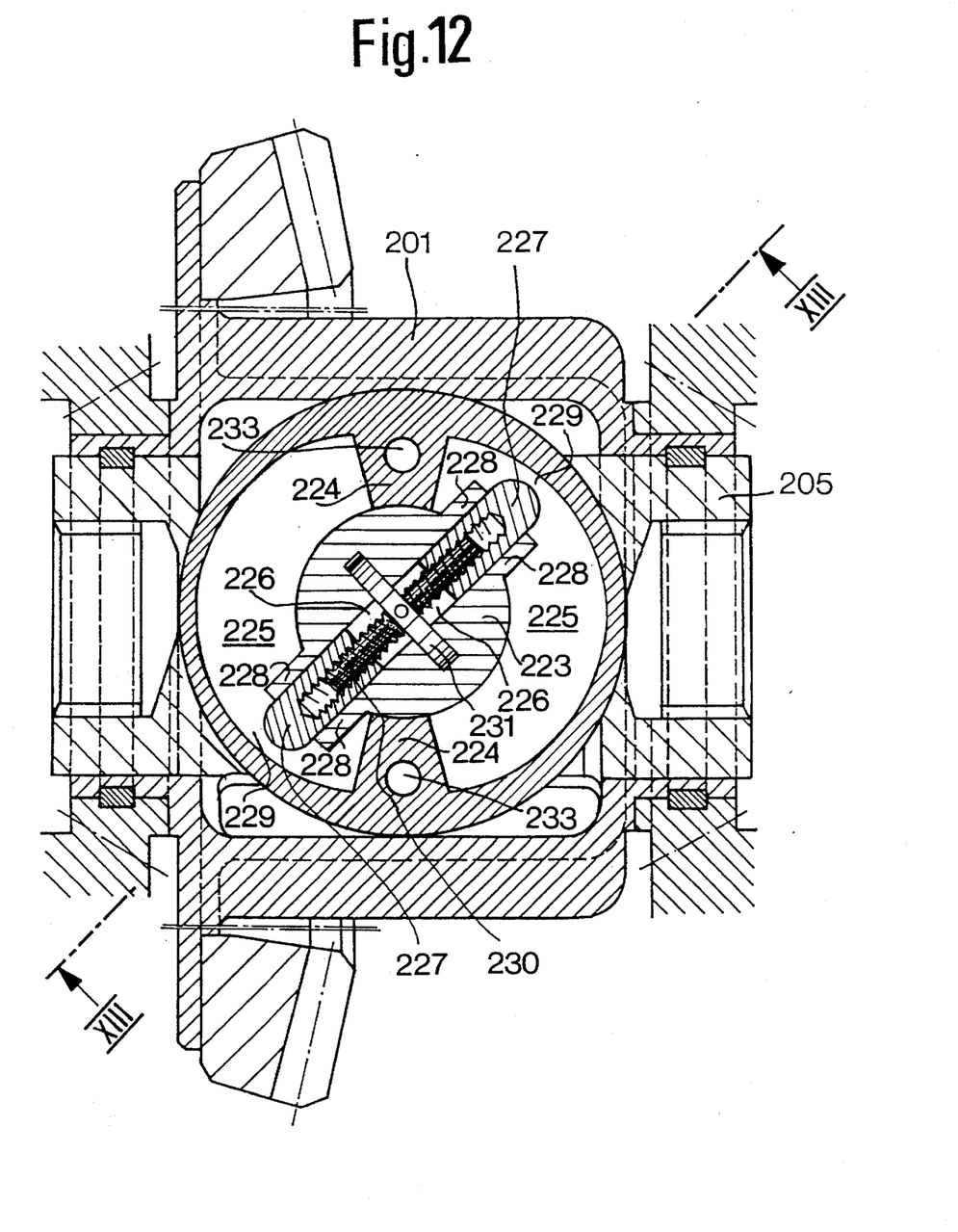
FIG. 12 is a cross sectional view of a variation of the third embodiment, designed as a locking differential, according to FIG. 7.
Figure 13:
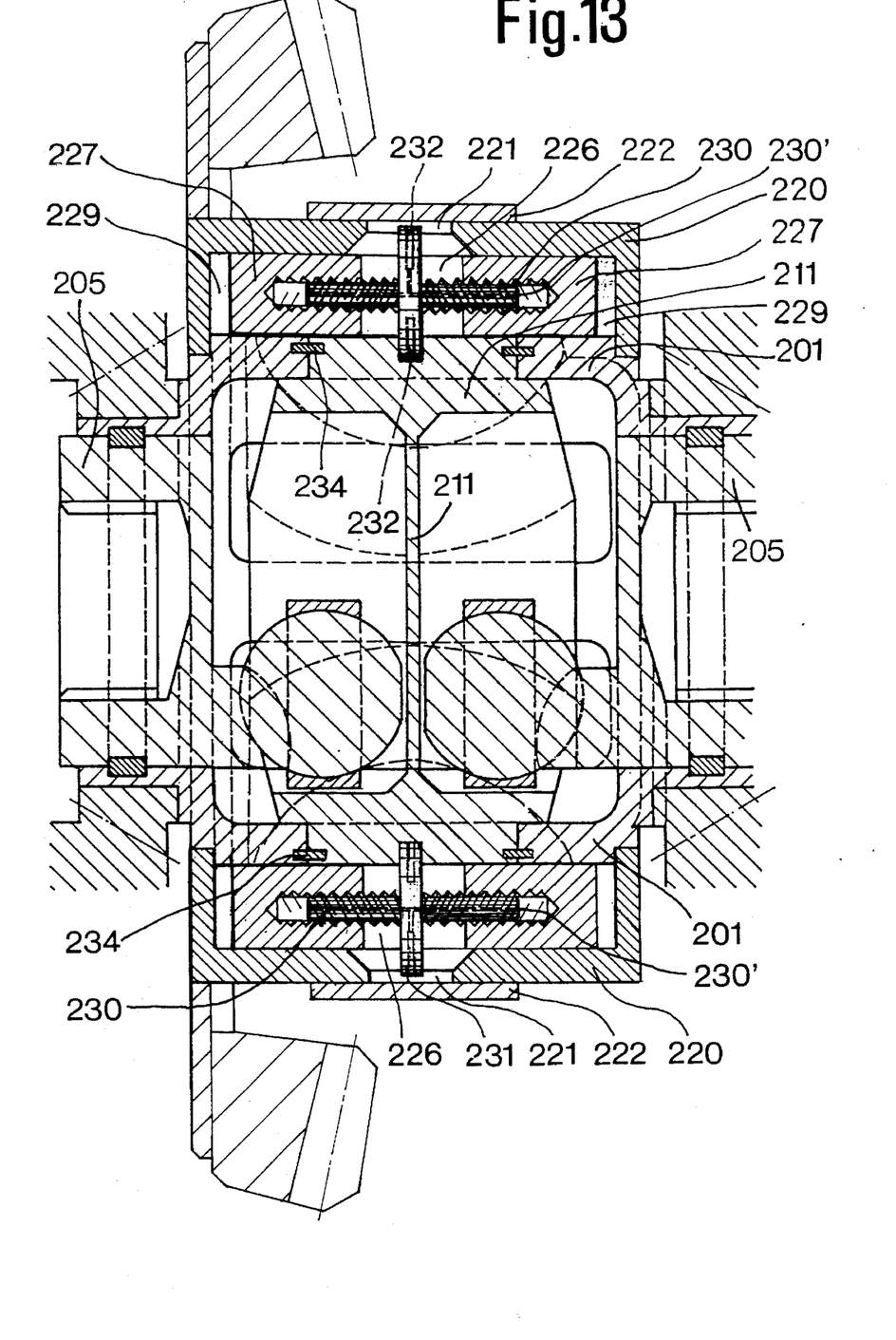
FIG. 13 is a sectional view taken along the line XIII—XIII of FIG. 12.

The embodiment shown in FIGS. 12 and 13 is a variation of the third embodiment shown in FIGS. 6 to 8. The modification relates to an addition of a hydraulic braking device, by means of which the differential gear has the properties of a locking differential. This embodiment is similar to the embodiment according to FIGS. 6 to 8 except for the braking device. Thus, similar parts are labelled with the same reference numerals previously given, and only the braking device is explained in detail.

Referring now to FIG. 13, the outside of the two walls, which are parallel to the plane of division of the two part housing 201 and belong to housing 201, which contains the bearing bores for coupling link 211, is provided with one seat each which is concentric to the bearing bore. This seat carries fluid-tight the free end of cylinder 220, whose bottom is provided with central opening 221, which can be moved so as to be fluid-tight from the outside by means of cover 222.

The two journals of coupling link 211, which can be rotated in the two bearing bores of housing 201, are extended into one or the other cylinder 220 up to the vicinity of this bottom. This extension is denoted 223. Two diametrically arranged, radial protrusions 224 of cylinder 220, by means of which the interior of cylinder 220 is divided into two chambers 225, each of which has the shape of a ring segment, extend as far as the shell of said extension.

As especially evident from FIG. 12, extensions 223 are provided with slot 226 penetrating them radially. In this slot 226 two identically designed stop slide valves 227 are arranged symmetrically to the axis of rotation of extension 223. These two stop slide valves 227, which protrude into the one or the other chamber 225, lie sealingly both at the bottom of the cylinder 220 and also on the outside of the housing wall, bearing cylinder 220, and the flanks of slot 226. In the embodiment the end of stop slide valves 227 projecting into chamber 225 is curved semi-cylindrically, whereby the axis of curvature lies parallel to the axis of rotation of the extension 223. For a better lateral guide of stop slide valves 227, two guidechecks 228, which extend slot 226 radially to the outside, are molded to extension 223 for each stop slide valve 227.

Since chambers 225 and the remaining spaces of the cylinders up to cover 222 are completely filled with a fluid, for example, a hydraulic oil, and the coupling link 221 oscillates around its longitudinal axis, wherein the angle of rotation is less than 180°, then fluid is pushed from one part of each chamber 225 through gap 229 between the inner wall of the cylinder 220 and stop slide valve 227 into the other part when, as a consequence of a different rotational speed of both output elements 205, coupling link 211 carries out said oscillating rotation. The consequence of the throttling effect achieved is that a braking effect is exerted on the ever faster rotating output element 205. The narrower the gap 229, the greater is this braking effect.

To adjust and change the width of gap 229, both stop slide valves 227 are provided with a radially extending blind hole-taphole. Threaded spindle 230, whose engaging segments are provided with suitable threads, engages with these tapholes, which are aligned and of which the one is designed as a right-handed thread and the other as a left-handed thread. Over half the length the threaded spindle 230 carries a driving disk 231, which is connected firmly to said threaded spindle and which can be rotated yet axially moved in a slot which lies within extension 223 and extends perpendicularly to slot 226. As FIG. 13 shows, driving disk 231 projects beyond the free end of extension 223 and into central opening 221 of the cylinder bottom. In addition, driving disk 231 is provided with radial bores 232, into which to rotate driving disk 231 a pin can be inserted when cover 222 is detached. Depending on the direction of rotation of driving disk 231, gap 229 is enlarged or reduced. A central passage bore 230' of the threaded spindle 230 communicates by way of a connecting bore with one of the radial bores.

Since the speed of rotation of coupling link 211 during the oscillating movement is the lowest at the start and at the end of the rotational region and is the highest in the center of the rotational region, the inner wall of cylinder 220 is designed in such a manner that the width of gap 229 decreases starting from the center of the rotational region and going towards the two ends, whereby the throttle effect increases. By means of this measure the braking torque evens out, a feature that has an effect on the ever faster rotating output element 205.

Each passage bore 233 in protrusions 224 of cylinder 220, each of which align with one passage bore in the bottom of cylinder 220, is aligned with each taphole in the housing 201. Therefore, cylinder 220 can be connected by means of screws, which penetrate passage bores 233, to housing 201. To prevent the fluid from flowing out of chambers 225 into the interior of housing 201, each of the two bearing bores for coupling link 211 is provided with ring seal 234.

The braking function would also be guaranteed if only one single cylinder 220 were provided. However, it is more advantageous in light of the mass equilibrium and the required overall dimensions to provide, as in the described embodiment, two cylinders.

In a manner analogous to the embodiment according to FIGS. 6 to 8, all of the other embodiments can be equipped with an oscillating rotational movement of the coupling link, thus in particular the embodiment according to FIGS. 9 to 11, with the described braking device.

Although only preferred embodiments are specifically illustrated and described herein, it will be appreciated that many modifications and variations of the present invention are possible in light of the above teachings and within the purview of the appended claims without departing from the spirit and intended scope of the invention.

What is claimed:

1. Differential gear with a swivel-mounted bearing means, which may be rotated by a drive element; two output elements, which are swivel-mounted in the bearing means and are coaxial to its axis of rotation; and a clutching device, which can be moved relative to the bearing means and the output elements and which connects the output elements to the bearing means in a manner that allows different speeds both between the output elements and the bearing means and also between the output elements, the improvement wherein a) neither the clutching device nor the output elements includes a toothed rim;

b) each of the two output elements having a connecting link with a connecting point, which lies eccentrically with respect to the axis of rotation of the output element for connecting said clutching device; and c) said clutching device includes a coupling link which is mounted in the bearing means so as to rotate about an axis, which extends perpendicularly to the axis of rotation of the bearing means between the two output elements, said coupling link including a cylindrical center piece which can be moved longitudinally in said bearing means; a pair of arms, having free ends in the shape of at least one incomplete ball projects in opposite radial directions; each of said balls forming a ball joint which is embedded in a spherical bearing bed of a first or second swash plate; connecting bodies being connected at a distance from the center of the bearing bed to the assigned connecting link at an eccentrically arranged connecting point so as to swivel around an articulated axis, extending at right angles to its axis of rotation.

2. Differential gear, as in claim 1, wherein a) the two end segments of the longitudinally moveable coupling link are pistons, to each of which is assigned a cylinder that is immoveable relative to said bearing means, b) the center piece of said coupling link includes at least one continuous channel which penetrates said link in the axial direction and by means of which the interiors of both cylinders are connected, and c) said cylinders and the continuous channel of said center piece including a fluid.

3. Differential gear, as claimed in claim 2, wherein said center piece channel has a controller which is connected to one of the cylinders and which influences the free cross sectional area of the channel for the fluid.

4. Differential gear, as claimed in claim 3, wherein said channel of the center piece and said controller form a throttling segment for the fluid with a throttling effect that is dependent on the axial position of said center piece.

5. Differential gear, as claimed in claim 4, wherein the free cross sectional area of the said channel is a maximum at the center position of said center piece.

6. Differential gear comprising: a swivel-mounted bearing block, which can be set rotating about an axis of rotation by means of a drive element; two output elements, which are swivel-mounted in the bearing block and are coaxial to the axis of rotation; and a clutching device, which can be moved relative to the bearing block and the output elements and which connects the output elements to the bearing block in a manner that allows different speeds both between the output elements and the bearing block and also between the output elements, wherein a) the clutching device and the output elements each have a rim free of teeth, b) each of the two output elements is provided with one connecting link each with a connecting point, which lies eccentrically to the axis of rotation of the output element, for the connection to the clutching device, c) the clutching device having a coupling link, which is mounted in the bearing block so as to rotate around an axis which extends perpendicularly to the axis of rotation of the bearing block, between the two output elements, and d) the coupling link having a cylindrical center piece, which can be slid longitudinally in the bearing block, said center piece having two arms each having a free end in the shape of at least one incomplete ball, said arms projecting in opposite radial directions; and wherein each of the two balls is embedded in a bearing bed formed in a disk, thereby forming one ball joint each, wherein the bearing beds are spherical and the disks are in the form of swash plates, which are connected to a corresponding connecting link at a distance from the center of the bearing bed in the eccentrically arranged connecting point so as to swivel around an articulated axle, extending at right angles to the axis of rotation.

* * * * *